United States Patent
Na et al.

(10) Patent No.: US 9,417,790 B2
(45) Date of Patent: Aug. 16, 2016

(54) MOBILE TERMINAL AND METHOD FOR CONTROLLING OF THE SAME

(71) Applicant: LG ELECTRONICS INC., Seoul (KR)

(72) Inventors: Sungchae Na, Seoul (KR); Taeyoung Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 475 days.

(21) Appl. No.: 13/901,487

(22) Filed: May 23, 2013

(65) Prior Publication Data

US 2014/0013269 A1     Jan. 9, 2014

(30) Foreign Application Priority Data

Jul. 9, 2012    (KR) ........................ 10-2012-0074683

(51) Int. Cl.
    *G06F 3/048*           (2013.01)
    *G06F 3/0488*         (2013.01)

(52) U.S. Cl.
    CPC ................................. *G06F 3/04883* (2013.01)

(58) Field of Classification Search
    CPC ............................ G06F 3/0488; G06F 3/04883
    See application file for complete search history.

(56) References Cited

U.S. PATENT DOCUMENTS

| | | | | |
|---|---|---|---|---|
| 2004/0263486 | A1* | 12/2004 | Seni | G06F 3/0485 345/173 |
| 2005/0237311 | A1* | 10/2005 | Nakajima | G06F 3/04883 345/173 |
| 2006/0262102 | A1* | 11/2006 | Lee | G06F 9/4443 345/173 |
| 2010/0130257 | A1* | 5/2010 | Jang | G06F 3/016 455/566 |
| 2011/0109546 | A1* | 5/2011 | Milne | G06F 1/1694 345/158 |
| 2011/0157028 | A1* | 6/2011 | Stallings | G06F 3/04883 345/173 |
| 2012/0092355 | A1* | 4/2012 | Yamamoto | G06F 3/04883 345/522 |
| 2012/0260208 | A1* | 10/2012 | Jung | G06F 3/04886 715/773 |
| 2013/0167019 | A1* | 6/2013 | Wadayama | G06F 3/0483 715/251 |

* cited by examiner

*Primary Examiner* — Tadeese Hailu
(74) *Attorney, Agent, or Firm* — Lee, Hong, Degerman, Kang & Waimey PC; Jonathan Kang; Justin Lee

(57) ABSTRACT

A mobile terminal is provided. According to the mobile terminal, when a handwriting input, while being applied to a page displayed on a touch screen, enters a predetermined region of the page and a predetermined input with respect to the touch screen is received, the previously applied handwriting input is resized to secure an additional handwriting input region.

10 Claims, 24 Drawing Sheets

MOBILE TERMINAL AND METHOD FOR CONTROLLING OF THE SAME

CROSS-REFERENCE TO RELATED APPLICATIONS

Pursuant to 35 U.S.C. §119(a), this application claims the benefit of earlier filing date and right of priority to Korean Patent Application No. 10-2012-0074683, filed on Jul. 9, 2012, the contents of which are hereby incorporated by reference herein in its entirety.

BACKGROUND

1. Field

The present invention relates to a mobile terminal and a method of controlling the same, and more particularly, to a mobile terminal in which a handwriting input space is effectively used, and a method for controlling the same.

2. Related Art

As hardware and software techniques in relation to various electronic devices including mobile terminals have been remarkably advanced, electronic devices have been able to provide or store a variety of functions and information items. Thus, screens of electronic devices provide various types of information.

Also, in case of a mobile terminal having a touch screen, various types of information provided to a touch screen may be accessed only through a user's touch manipulation.

Meanwhile, the recent development of a technique of recognizing a user's handwriting input through a touch screen has triggered the necessity of development of a user interface for a handwriting input.

In particular, in case of a mobile terminal having a touch screen with a limited size, a user interface for securing a space on a touch screen allowing a user to perform a handwriting input is required.

SUMMARY

An aspect of the present invention provides a mobile terminal allowing a user to conveniently perform a handwriting input on a touch screen, and a method of controlling the same.

Another aspect of the present invention provides a mobile terminal capable of guaranteeing continuity of a user's handwriting input although a touch screen thereof has a limited size, and a method of controlling the same.

According to an aspect of the present invention, there is provided a mobile terminal including: a touch screen; and a controller configured to display a page recognizing a handwriting input on the touch screen, resize the handwriting input when the handwriting input enters a predetermined region of the page in the middle of receiving the handwriting input and a predetermined input applied to the touch screen is received, and provide a region generated according to the resizing results, as an additional handwriting input region.

The controller may execute at least one item, and when the mobile terminal enters a handwriting input mode while an execution screen of the item is being displayed on the touch screen, the page may include a captured image of the execution screen of the item.

The predetermined region may include a region spaced apart from the boundary of the touch screen by a predetermined distance.

The predetermined input may include releasing of the touch input for the handwriting input which has entered the predetermined region.

The mobile terminal may further include: a sensing unit configured to detect a tilt of the touch screen, wherein the predetermined input may include an input of a sensing signal for recognizing that touch screen is tilted in a predetermined direction, and the controller may reduce a size of the handwriting input in a direction in which the touch screen is tilted.

The page may be divided into a plurality of virtual regions which are sequentially connected, the predetermined region may include the last region, among the plurality of virtual regions, in contact with a boundary of the touch screen, and the predetermined input may include a handwriting input applied to the last region.

The controller may resize handwriting inputs applied to the respective virtual regions at different rates and display the same on the touch screen.

According to another aspect of the present invention, there is provided a mobile terminal including: a touch screen; and a controller configured to display a page recognizing a handwriting input on the touch screen, slide the page in a direction in which the handwriting input is applied on the basis of a particular point of a predetermined region of the page when the handwriting input enters the predetermined region and a predetermined input applied to the particular point is received, and provide a region generated according to the sliding, as an additional handwriting input region.

The predetermined region may include a region in which a handwriting input is not possibly performed after the currently input handwriting input is terminated.

The predetermined input may include a double tapping input applied to the particular point.

The controller may display a soft button for extending a space for the handwriting input in the predetermined region, and when an input applied to the soft button is received, the controller may slide the page.

The soft button may include a direction key for recognizing a direction in which the page is slid.

According to another aspect of the present invention, there is provided a method of controlling a mobile terminal, including: displaying a page for recognizing a handwriting input on a touch screen; when the handwriting input, while being applied, enters a predetermined region of the page and a predetermined input applied to the touch screen is received, resizing the handwriting input; and providing a region generated according to the resizing results, as an additional handwriting input region.

According to another aspect of the present invention, there is provided a method of controlling a mobile terminal, including: displaying a page for recognizing a handwriting input on a touch screen; when the handwriting input enters a predetermined region of the page and a predetermined input applied to a particular point of the predetermined region is received, sliding the page in a direction in which the handwriting input was applied on the basis of the particular point; and providing a region generated according to the sliding, as an additional handwriting input region.

Details of other embodiments are included in detailed descriptions and drawings.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION

Figure 1:
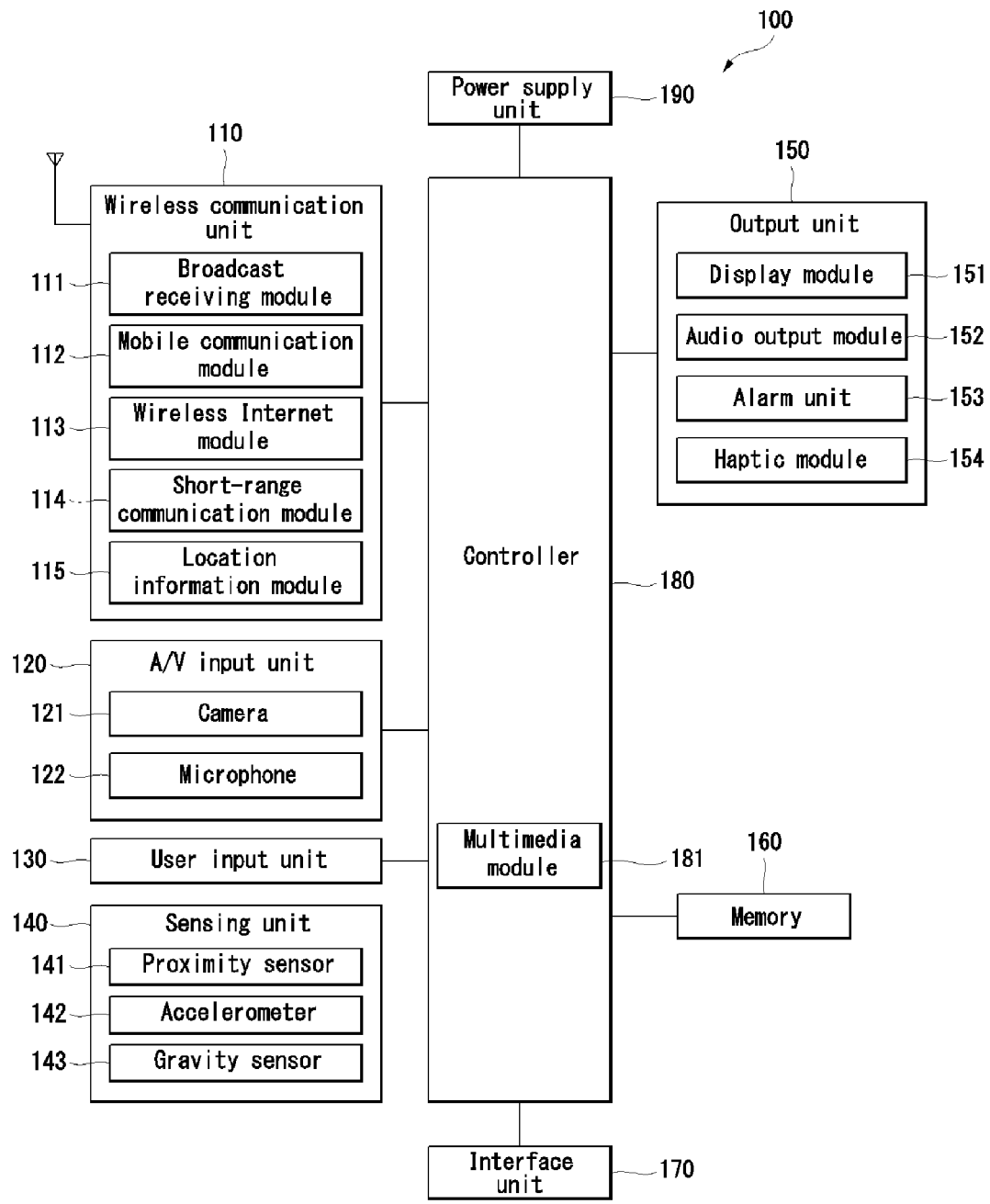
FIG. 1 is a block diagram of a mobile terminal according to an embodiment of the invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Referring to FIG. 1, a mobile terminal 100, as an example of the electronic device 100 related to this invention, is described in detail with reference to the accompanying drawings. FIG. 1 is a block diagram of the mobile terminal according to an embodiment of this invention. As used herein, the suffixes 'module' and 'unit' are used for elements in order to facilitate the disclosure only. Therefore, significant meanings or roles are not given to the suffixes themselves and it is understood that the 'module' and 'unit' can be used together or interchangeably.

Referring to FIG. 1, the mobile terminal 100 includes a wireless communication unit 110, an audio/video (A/V) input unit 120, a user input unit 130, a sensing unit 140, an output unit 150, a memory 160, an interface unit 170, a controller 180, and a power supply unit 190. Although FIG. 1 shows the mobile terminal 100 having various components, it is understood that implementing all of the illustrated components is not a requirement. More or fewer components may alternatively be implemented.

The wireless communication unit 110 includes one or more components that permit wireless communication between the mobile terminal 100 and a wireless communication system or a network within which the mobile terminal 100 is located. For example, the wireless communication unit 110 includes a broadcast receiving module 111, a mobile communication module 112, a wireless Internet module 113, a short-range communication module 114 and a location information module 115. For non-mobile terminals, the wireless communication unit 110 may be replaced with a wired communication unit. The wireless communication unit 110 and the wired communication unit may be commonly referred to as a communication unit.

The broadcast receiving module 111 receives a broadcast signal and/or broadcast associated information from an external broadcast managing entity via a broadcast channel. The broadcast channel may include a satellite channel and/or a terrestrial channel.

The broadcast managing entity may refer to a system that transmits a broadcast signal and/or broadcast associated information. The broadcast managing entity may be a server that generates and transmits broadcast signals and/or broadcast associated information or a server for receiving previously generated broadcast signals and/or broadcast-related information and transmitting the broadcast signals and/or the broadcast associated information to the mobile terminal 100. The broadcast signals may include not only TV broadcast signals, radio broadcast signals, and data broadcast signals, but also signals in the form of a TV broadcast signal combined with a radio broadcast signal.

The broadcast associated information may be information about a broadcast channel, a broadcast program, or a broadcast service provider. The broadcast associated information may even be provided over a mobile communication network. In the latter case, the broadcast associated information may be received via the mobile communication module 112. Examples of broadcast associated information include an electronic program guide (EPG) of digital multimedia broadcasting (DMB) and an electronic service guide (ESG) of digital video broadcast-handheld (DVB-H).

The broadcast receiving module 111 may receive broadcast signals transmitted from various types of broadcast systems. As a non-limiting example, the broadcast systems include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The broadcast receiving module 111 may also receive multicast signals. The broadcast signals and/or the broadcast associated information received by the broadcast receiving module 111 may be stored in a suitable storage device, such as in the memory 160.

The mobile communication module 112 transmits/receives wireless signals to/from at least one of a base station, an external terminal or a server over a mobile communication network. The wireless signals may represent, for example, voice call signals, video telephony call signals or data in various forms according to the transmission/reception of text and/or multimedia messages.

The wireless Internet module 113 supports Internet access for the mobile terminal 100. This wireless Internet module 113 may be internally or externally coupled to the mobile terminal 100. Suitable technologies for wireless Internet include, but are not limited to, WLAN (Wireless LAN), Wi-Fi®, Wibro® (Wireless broadband), Wimax® (World Interoperability for Microwave Access), and HSDPA (High Speed Downlink Packet Access). The wireless Internet module 113 may be replaced with a wired Internet module in non-mobile terminals. The wireless Internet module 113 and the wired Internet module may be commonly referred to as an Internet module.

The short-range communication module 114 facilitates relatively short-range communications. Suitable technologies for short-range communication include, but are not limited to, radio frequency identification (RFID), infrared data association (IrDA), ultra-wideband (UWB), as well as networking technologies such as Bluetooth® and ZigBee®.

The location information module 115 identifies or otherwise obtains a location of the mobile terminal 100. The location information module 115 may obtain position information by using a global navigation satellite system (GNSS). The GNSS is a term used to describe radio navigation satellite systems configured to send reference signals capable of determining their positions on the surface of the earth or near the surface of the earth while revolving around the earth. The GNSS includes: a global position system (GPS) operated by the U.S.A.; Galileo, operated by Europe; a global orbiting navigational satellite system (GLONASS) operated by Russia; COMPASS, operated by China; and a quasi-zenith satellite system (QZSS) operated by Japan.

As a typical example of the GNSS, the location information module 115 is a GPS module. The location information module 115 may calculate information related to distances between one point or object and at least three satellites and information related to the time when the distance information was measured and apply trigonometry to the obtained distance information to obtain three-dimensional position information on the point or object according to the latitude, longitude, and altitude at a predetermined time. Furthermore, a method of calculating position and time information using three satellites and correcting the calculated position and time information using another satellite may also used. The location information module 115 continues to calculate a current position in real time and to calculate velocity information based on the position information.

With continued reference to FIG. 1, the audio/video (A/V) input unit 120 may be configured to provide audio or video signal input to the mobile terminal 100. The A/V input unit 120 may include a camera 121 and a microphone 122. The camera 121 processes image frames of still pictures or video obtained by an image sensor in a photographing mode or a video telephony mode. The processed image frames may be displayed on a display unit 151.

The image frames processed by the camera 121 may be stored in the memory 160 or transmitted to an external device through the wireless communication unit 110. Optionally, the mobile terminal 100 can include two or more cameras 121, if appropriate.

The microphone 122 receives an external audio signal while the mobile terminal 100 is in a particular mode, such as a phone call mode, a recording mode and/or a voice recognition mode. The received audio signal is processed and converted into digital data. In the call mode, the processed digital data is transformed into a format transmittable to a mobile communication base station via the mobile communication module 112 and then output. Furthermore, the mobile terminal 100, and in particular the A/V input unit 120, may include a noise removing algorithm to remove noise generated in the course of receiving the external audio signal.

The user input unit 130 generates input data in response to user manipulation of an associated input device or devices. Examples of such devices include a keypad, a dome switch, a touchpad (e.g., static pressure/capacitance), a jog wheel and a jog switch. A specific example of the user input unit 130 is a touch screen in which a touchpad is combined with a display, as will be described below.

The sensing unit 140 provides status measurements of various aspects of the mobile terminal 100. For example, the sensing unit 140 may detect an open/closed status of the mobile terminal 100, relative positioning of components (e.g., a display and a keypad) of the mobile terminal 100, a change of position of the mobile terminal 100 or a component of the mobile terminal 100, a presence or absence of user contact with the mobile terminal 100, an orientation of the mobile terminal 100 and/or acceleration/deceleration of the mobile terminal 100.

As an example, the mobile terminal 100 may be configured as a slide-type mobile terminal in which the sensing unit 140 may sense whether a sliding portion of the mobile terminal 100 is open or closed. The sensing unit 140 may also sense presence or absence of power provided by the power supply unit 190 or the presence or absence of a coupling or other connection between the interface unit 170 and an external device.

The sensing unit 140 may include an accelerometer 142. The accelerometer 142 is an element that changes an electrical signal with respect to a change in acceleration in any one direction, which has been widely used in line with the development of a micro-electromechanical systems (MEMS) technique. There may be various types of accelerometers from an accelerometer installed in an airbag system of a vehicle and used to measure acceleration having a high value used to sense collision to an accelerometer recognizing a subtle motion of a user's hand to measure acceleration having a minute value so as to be used as an input unit for games, and the like. In the case of the accelerometer 142, in general, a 2-axis accelerometer or a 3-axis accelerometer is configured as being mounted on a single package, and according to a usage environment, only a Z-axis may be required. Thus, in case of using an X-axis or Y-axis directional accelerometer, instead of a Z-axis directional accelerometer, the accelerometer may be mounted vertically on a main substrate by using a separate substrate.

The sensing unit 140 may include a gravity sensor 143. The gravity sensor 143 includes any types of sensor sensing a rotational state of a mobile terminal. In the case of the gravity sensor 143, a balance weight is connected to a variable resistor and a current rotational stator or tilt of a mobile terminal is sensed based on a change in resistance according to a rotation of the mobile terminal, or a conductive object is placed in a central portion and a rotational state may be sensed according to a direction in which a conductive object is brought into contact according to a rotation.

The output unit 150 serves to generate an output in relation to sense of sight, sense of hearing, sense of touch, or the like. The output unit 150 may include a display unit 151, an audio output module 152, an alarm unit 153, a haptic module 154, and the like.

The output unit 150 generates output relevant to the senses of sight, hearing and touch. The output unit 150 may include a display unit 151, an audio output module 152, an alarm 153, and a haptic module 154.

The display unit 151 displays information processed by the mobile terminal 100. For example, when the mobile terminal 100 is in a call mode, the display unit 151 may display a user interface (UI) or a graphic user interface (GUI) associated with the call. If the mobile terminal 100 is in a video communication mode or a photograph mode, the display unit 151 may display a photographed and/or received picture, a UI or a GUI.

The display unit 151 may include a liquid crystal display (LCD), a thin film transistor liquid crystal display (TFT LCD), an organic light-emitting diode (OLED), a flexible display, or a 3-dimensional display. The mobile terminal 100 may include one or more of such displays The display unit 151 may have a transparent or light-transmissive type configuration, hereinafter referred to as a transparent display. A transparent OLED (TOLED) is an example of a transparent display. A rear configuration of the display unit 151 may also have the light-transmissive type configuration. In this configuration, a user is able to see an object located behind the terminal body via the area occupied by the display unit 151 of the terminal body.

At least two display units 151 may be provided. For example, a plurality of display units 151 may be provided on a single face of the mobile terminal 100 spaced apart from each other or built in one body. Alternatively, each of a plurality of display units 151 may be provided on different faces of the mobile terminal 100.

If the display unit 151 and a sensor for detecting a touch action (hereafter referred to as a 'touch sensor') are constructed in a mutual-layered structure (hereafter referred to as a 'touch screen'), the display unit 151 may be used as an input device and an output device. For example, the touch sensor may include a touch film, a touch sheet or a touchpad.

The touch sensor can be configured to convert a pressure applied to a specific portion of the display unit 151 or a variation of electrostatic capacity generated from a specific portion of the display unit 151 to an electric input signal. The touch sensor may detect a pressure of a touch as well as a touched position or magnitude of the touch.

If a touch input is made to the touch sensor, a signal (s) corresponding to the touch input is transferred to a touch controller (not shown). The touch controller processes the signal(s) and then transfers corresponding data to the controller 180. The controller 180 may determine, therefore, which portion of the display unit 151 is touched.

With continued reference to FIG. 1, a proximity sensor 141 can be provided within the mobile terminal 100 enclosed by the touch screen or around the touch screen. The proximity sensor 141 may detect a presence or non-presence of an object approaching a specific detecting surface or an object existing around the proximity sensor 141 using an electromagnetic field strength or infrared ray without mechanical contact. Accordingly, the proximity sensor 141 may have greater durability and greater utility than a contact type sensor.

The proximity sensor 141 can include a transmissive photoelectric sensor, a direct reflective photoelectric sensor, a mirror reflective photoelectric sensor, a radio frequency oscillation proximity sensor, an electrostatic capacity proximity sensor, a magnetic proximity sensor or an infrared proximity sensor. If the touch screen is an electrostatic type touch screen, the proximity sensor 141 may detect proximity of a pointer using a variation of an electric field according to the proximity of the pointer and the touch screen (touch sensor) may be classified as the proximity sensor 141.

An action in which a pointer approaches the touch screen without contacting the touch screen, yet is recognized as being located on the touch screen, is referred to as a 'proximity touch'. An action in which the pointer actually touches the touch screen is referred to as a 'contact touch'. The position on the touch screen proximity-touched by the pointer refers to the position of the pointer that vertically opposes the touch screen when the pointer performs the proximity touch.

The proximity sensor 141 may detect a proximity touch and/or a proximity touch pattern (e.g., proximity touch distance, proximity touch duration, proximity touch position, proximity touch shift state). Information corresponding to the detected proximity touch action and/or the detected proximity touch pattern may be displayed on the touch screen.

The controller 180 (FIG. 1) recognizes the proximity touch as one of various input signals according to proximity depth and position of the pointer. The controller 180 performs various operation controls according to various input signals.

Referring again to FIG. 1, the audio output module 152 may output audio data that is received from the wireless communication unit 110 in, for example, a call-receiving mode, a call-placing mode, a recording mode, a voice recognition mode or a broadcast receiving mode. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include, for example, a receiver, a speaker or a buzzer.

The alarm 153 outputs a signal for announcing an occurrence of a particular event associated with the mobile terminal 100. Typical events include a call signal reception, a message reception, a key signal input and a touch input. The alarm 153 outputs a signal for announcing the event occurrence via vibration as well as a video signal or an audio signal. The video signal is output via the display unit 151 and the audio signal is output via the audio output module 152. Hence, at least the display unit 151 or the audio output module 152 can be regarded as part of the alarm 153.

The haptic module 154 may generate various haptic effects that can be sensed by a user. Vibration is a representative tactile effect generated by the haptic module 154. Strength and pattern of the vibration generated from the haptic module 154 may be controllable. For example, vibrations differing from each other can be output by being synthesized together or can be output in sequence.

The haptic module 154 may generate various haptic effects in addition to vibration. For example, the haptic module 154 may generate an effect caused by a pin array vertically moving against skin being touched, an air injection force via an injection hole, an air suction force via a suction hole, an effect of skimming on a skin surface, an effect of contact with an electrode, an effect of electrostatic power and/or an effect of a hot/cold sense using an endothermic or exothermic device.

The haptic module 154 can be configured to provide the haptic effect via direct contact. The haptic module 154 can also be configured to enable a user to experience the haptic effect via muscular sense of a finger or an arm. Two or more haptic modules 154 can be provided according to a configuration of the mobile terminal 100.

The memory 160 is configured to store programs for operation of the controller 180. The memory 160 may temporarily store input/output data (e.g., phonebook, message, still picture, moving picture, etc.). The memory 160 may store data of vibration and sound in various patterns output when the touch screen receives a touch input.

The memory 160 may include, for example, a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk or an optical disk. The mobile terminal 100 may operate in association with a web storage that performs a storage function of the memory 160 via the Internet.

The interface unit 170 couples the mobile terminal 100 with external devices. The interface unit 170 receives data from an external device. The interface unit 170 is supplied with power and may be configured to deliver the power to elements within the mobile terminal 100. The interface unit 170 may be configured to enable data to be transferred from the mobile terminal 100 to an external device. The interface unit 170 may be configured to include a wired/wireless headset port, an external charger port, a wire/wireless data port, a memory card port, a port for coupling to a device having an identity module, an audio input/output (I/O) port, a video input/output (I/O) port or an earphone port.

The identity module is a chip or card that stores various types of information for authenticating a use authority of the mobile terminal 100 and can include a user identity module (UIM), a subscriber identity module (SIM) and/or a universal subscriber identity module (USIM). A device provided with the above identity module (hereafter referred to as an 'identity device') may be manufactured in the form of a smart card. The identity device is connectable to the mobile terminal 100 via a corresponding port.

The interface unit 170 may be configured as a passage for supplying power to the mobile terminal 100 from a cradle that is connected to the mobile terminal 100. The interface unit 170 may facilitate delivery of various command signals, which are input via the cradle by a user, to the mobile terminal 100. Various command signals input via the cradle or the power may work as a signal for recognizing that the mobile terminal 100 is correctly loaded in the cradle.

The controller 180 typically controls the overall operations of the mobile terminal 100. For example, the controller 180 performs control and processing associated with voice calls, data communications and video conferences. The controller 180 may include a multimedia module 181 that provides multimedia playback. The multimedia module 181 may be configured as part of the controller 180 or may be configured as a separate component. The controller 180 may also perform pattern recognizing processing for recognizing a handwriting input performed on the touch screen as a character and/or recognizing a picture drawing input performed on the touch screen as characters or images.

The power supply unit 190 provides power required by the various components for the mobile terminal 100. The power may be internal power, external power, or combinations thereof.

Embodiments of the present invention described in the following description may be implemented within a recording medium that can be read by a computer or a computer-like device using software, hardware or combinations thereof. For hardware implementations, arrangements and embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors or electrical units for performing other functions. Such embodiments may also be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in the memory 160 and executed by the controller 180.

Figure 2A:
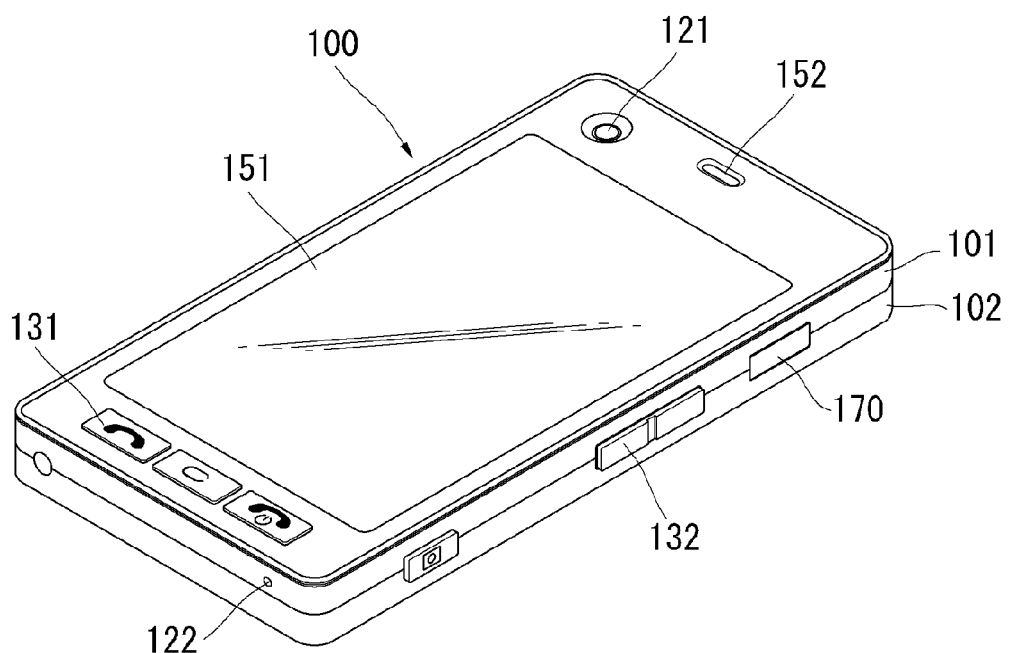
FIG. 2A is a front perspective view illustrating an example of a mobile terminal or a portable terminal in relation to an embodiment of the present invention.

FIG. 2A is a front perspective view of a mobile terminal or a handheld terminal 100 according to an embodiment of the present invention.

The handheld terminal 100 has a bar type terminal body. However, the present invention is not limited to a bar type terminal and can be applied to terminals of various types including slide type, folder type, swing type and swivel type terminals having at least two bodies that are relatively movably combined.

The terminal body includes a case (a casing, a housing, a cover, etc.) forming the exterior of the terminal 100. In the present embodiment, the case can be divided into a front case 101 and a rear case 102. Various electronic components are arranged in the space formed between the front case 101 and the rear case 102. At least one middle case can be additionally arranged between the front case 101 and the rear case 102.

The cases can be formed of plastics through injection molding or made of a metal material such as stainless steel (STS) or titanium (Ti).

The display unit 151, the audio output unit 152, the camera 121, the user input unit 130/131 and 132, the microphone 122 and the interface 170 can be arranged in the terminal body, specifically, in the front case 101.

The display unit 151 occupies most part of the main face of the front case 101. The audio output unit 152 and the camera 121 are arranged in a region in proximity to one of both ends of the display unit 151 and the user input unit 131 and the microphone 122 are located in a region in proximity to the other end of the display unit 151. The user input unit 132 and the interface 170 are arranged on the sides of the front case 101 and the rear case 102.

The user input unit 130 is operated to receive commands for controlling the operation of the handheld terminal 100 and can include a plurality of operating units 131 and 132. The operating units 131 and 132 can be referred to as manipulating portions and employ any tactile manner in which a user operates the operating units 131 and 132 while having tactile feeling.

First and second operating units 131 and 132 can receive various inputs. For example, the first operating unit 131 receives commands such as start, end and scroll and the second operating unit 132 receives commands such as control of the volume of sound output from the audio output unit 152 or conversion of the display unit 151 to a touch recognition mode.

Figure 2B:
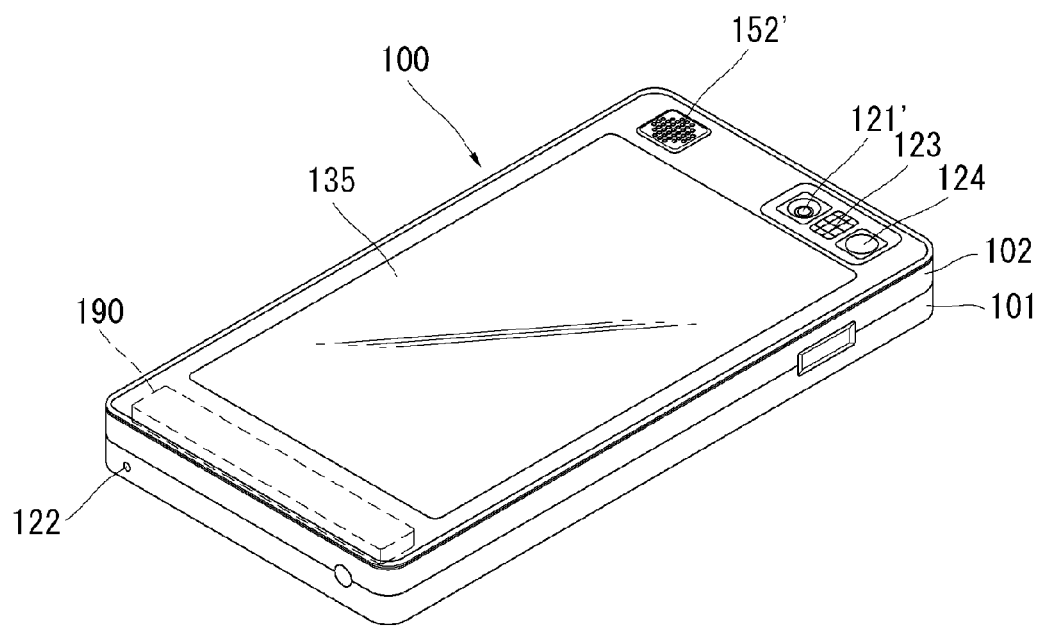
FIG. 2B is a rear perspective view of the mobile terminal illustrated in FIG. 2A.

FIG. 2B is a rear perspective view of the handheld terminal shown in FIG. 2A according to an embodiment of the present invention.

Referring to FIG. 2A, a camera 121' can be additionally attached to the rear side of the terminal body, that is, the rear case 102. The camera 121' has a photographing direction opposite to that of the camera 121 shown in FIG. 2A and can have pixels different from those of the camera 121 shown in FIG. 2A.

For example, it is desirable that the camera 121 has low pixels such that it can capture an image of the face of a user and transmit the image to a receiving part in case of video telephony while the camera 121' has high pixels because it captures an image of a general object and does not immediately transmit the image in many cases. The cameras 121 and 121' can be attached to the terminal body such that they can be rotated or pop-up.

A flash bulb 123 and a mirror 124 are additionally arranged in proximity to the camera 121'. The flash bulb 123 lights an object when the camera 121' takes a picture of the object. The mirror 124 is used for the user to look at his/her face in the mirror when the user wants to self-photograph himself/herself using the camera 121'.

An audio output unit 152' can be additionally provided on the rear side of the terminal body. The audio output unit 152' can achieve a stereo function with the audio output unit 152 shown in FIG. 2A and be used for a speaker phone mode when the terminal is used for a telephone call.

A broadcasting signal receiving antenna 124 can be additionally attached to the side of the terminal body in addition to an antenna for telephone calls. The antenna 124 constructing a part of the broadcasting receiving module 111 shown in FIG. 1 can be set in the terminal body such that the antenna 124 can be pulled out of the terminal body.

The power supply 190 for providing power to the handheld terminal 100 is set in the terminal body. The power supply 190 can be included in the terminal body or detachably attached to the terminal body.

A touch pad 135 for sensing touch can be additionally attached to the rear case 102. The touch pad 135 can be of a light transmission type as the display unit 151. In this case, if the display unit 151 outputs visual information through both sides thereof, the visual information can be recognized through the touch pad 135. The information output through both sides of the display unit 151 can be controlled by the touch pad 135. Otherwise, a display is additionally attached to the touch pad 135 such that a touch screen can be arranged even in the rear case 102.

The touch pad 135 operates in connection with the display unit 151 of the front case 101. The touch pad 135 can be located in parallel with the display unit 151 behind the display unit 151. The touch panel 135 can be identical to or smaller than the display unit 151 in size.

In an embodiment of the present invention, for the description purpose, the display unit 151 is assumed to be a touch screen 151. As mentioned above, the touch screen 151 may perform both an information display function and an information input function. However, the present invention is not limited thereto. Also, a touch mentioned in the present disclosure may include both a contact touch and a proximity touch.

Figure 3:
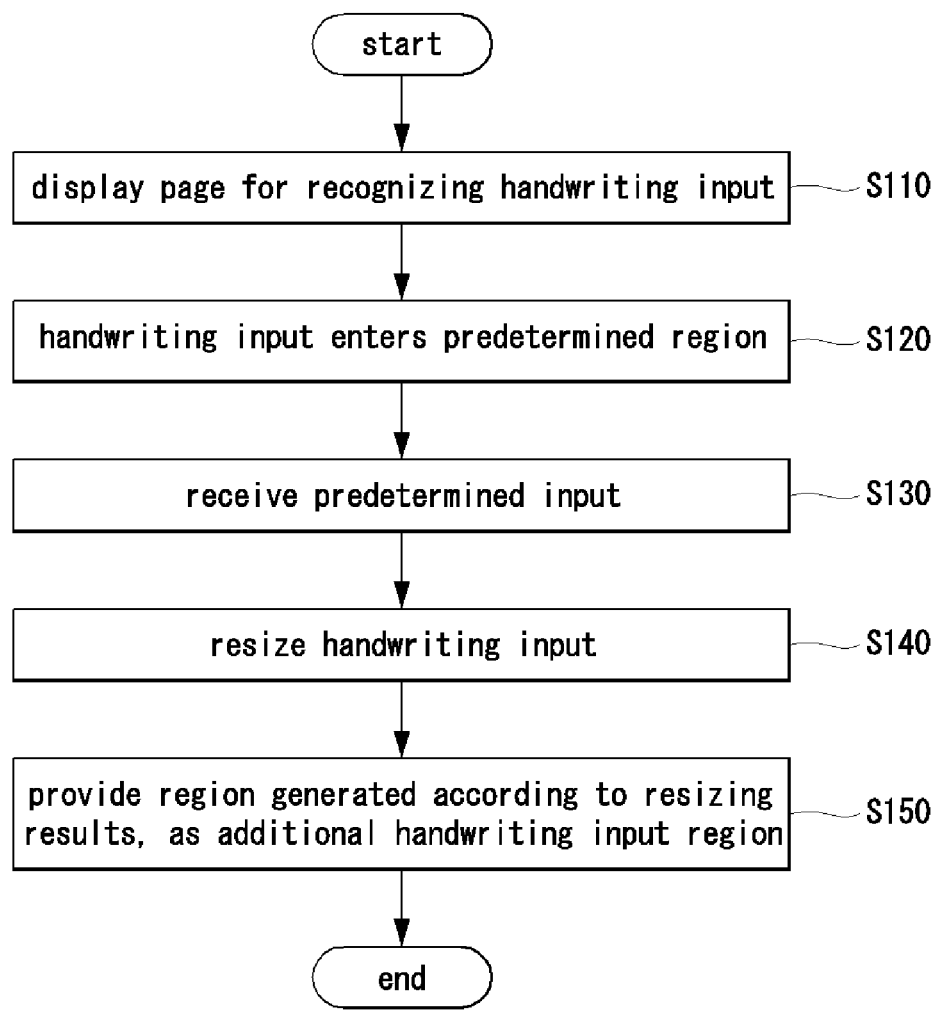
FIG. 3 is a flow chart illustrating a process of a method of controlling a mobile terminal according to a first embodiment of the present invention.

FIG. 3 is a flow chart illustrating a method of controlling a mobile terminal according to a first embodiment of the present invention.

The control method may be implemented in the mobile terminal 100 described above with reference to FIG. 1. Hereinafter, an operation of the mobile terminal according to a first embodiment of the present invention will be described with reference to the required drawings.

Referring to FIG. 3, the controller 180 of the mobile terminal 100 may display a page recognizing a handwriting input (S110).

Here, the page recognizing a handwriting input may refer to a screen provided through the touch screen 151 in a state in which the mobile terminal 100 has entered a handwriting input mode.

The handwriting input mode refers to a mode in which a handwriting input by a user to the touch screen 151 by using his hand or by using a tool (e.g., a stylus, or the like) is recognized and displayed as is on the touch screen 151.

In order to enter the handwriting input mode, the controller 180 may receive a predetermined user manipulation on the mobile terminal 100.

Figure 4:
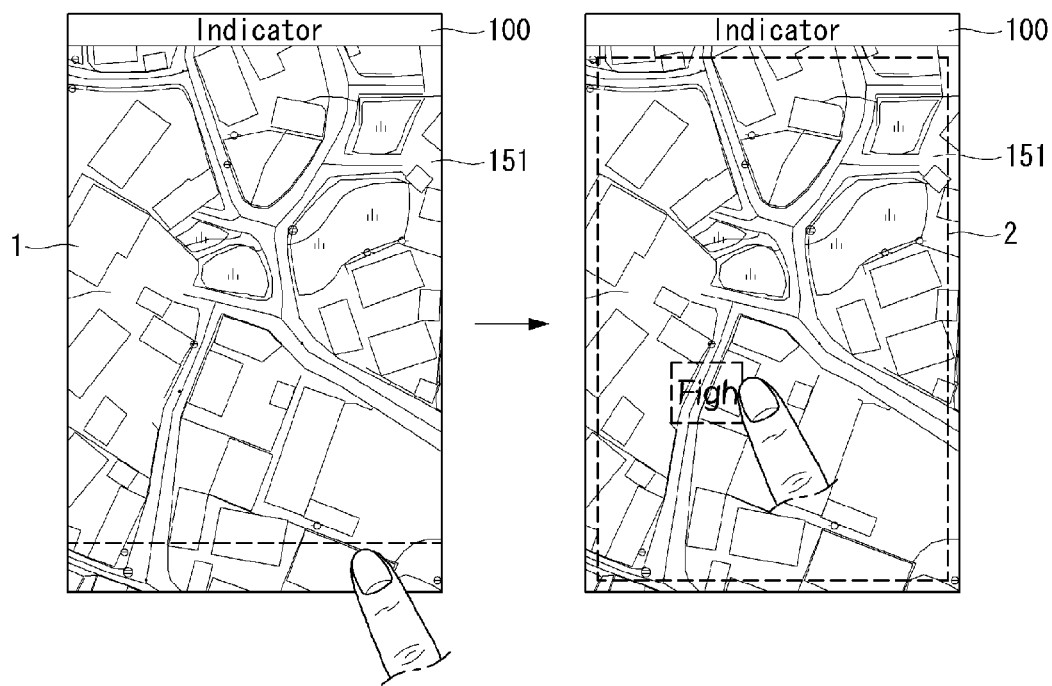
FIG. 4 is a view illustrating operation S110 in FIG. 3.

For example, referring to FIG. 4, the controller 180 may display an image 1 such as a photograph, a map, or the like, on the touch screen 151. Thereafter, when an input selecting a predetermined position, e.g., a lower corner portion of the touch screen 151, is received, the controller 180 may control the mobile terminal 100 to operate in the handwriting input mode.

Here, the controller 180 of the mobile terminal 100 may enter the handwriting input, while capturing an image currently displayed on the touch screen 151.

For example, the controller 180 may display a captured image on the touch screen 151 and recognize a user's handwriting input applied to the captured image 2.

However, without being limited to the foregoing example, the operation of entering the handwriting input mode in an embodiment of the present invention may be variously modified. For example, when the touch screen 151 is touched once, a soft button for entering the handwriting input mode may be displayed on the touch screen 151, and as the soft button is selected, the handwriting input may be entered.

Figure 5:
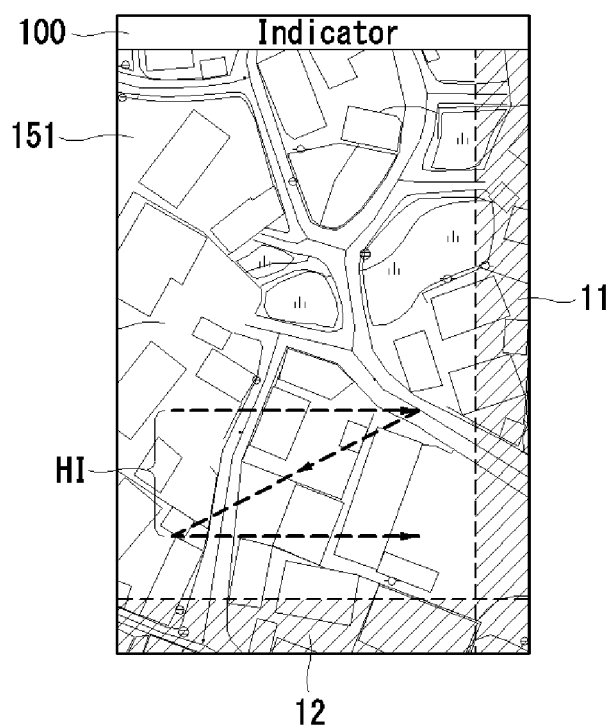
FIGS. 5 and 6 are views illustrating operation S120 in FIG. 3.
Figure 6:
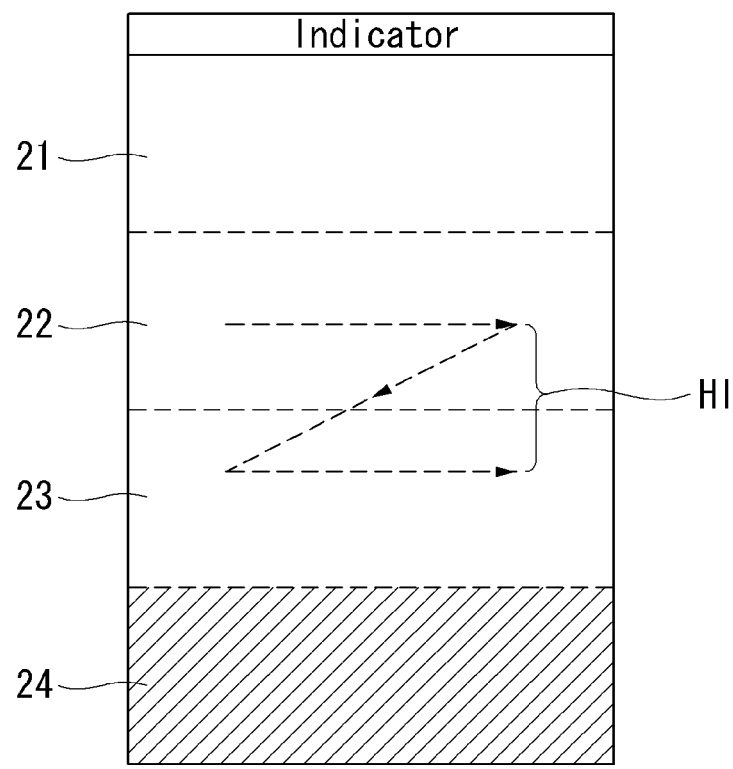

The controller 180 may recognize the case in which the handwriting input enters a predetermined region (S120). FIGS. 5 and 6 illustrate operation S120 of FIG. 3.

As illustrated in FIGS. 5 and 6, the handwriting input applied to the touch screen 151 may have predetermined directionality. For example, the handwriting input HI may be input by having directionality from the left to the right and/or from above to below. Thus, the handwriting input may be continued to enter a predetermined region of the touch screen 151.

Here, the predetermined region may include a region spaced apart from a boundary of the touch screen 151 by a predetermined distance. Namely, the predetermined region may be a boundary region of the touch screen which is so narrow that is it impossible to perform a handwriting input.

Thus, in such a case, according to embodiments of the present invention, an additional page may be provided to allow for a handwriting input. Here, the additional page may include a concept of being the same as an existing page in which the handwriting input is applied and the page visible in the touch screen 151 elongates. Thus, since the additional page is provided, the user may apply an additional handwriting input, in succession from the existing handwriting input, to the touch screen 151.

Meanwhile, the additional page may include a page currently displayed on the touch screen 151 and a page newly produced and displayed on the touch screen 151.

Referring to FIG. 5, the predetermined region may include a region spaced apart from a boundary of the touch screen 151 by a predetermined distance. For example, the predetermined region may include a right boundary region 11 of the touch screen 151 and a lower boundary region 12 of the touch screen 151.

Also, the predetermined region may be changed in real time according to a direction in which a handwriting input proceeds. For example, when the user wants to apply a handwriting input continuously in a horizontal direction on the touch screen 151 having a limited size, the controller 180 may set the right boundary region 11 (which may also include a left boundary region although not shown) of the touch screen 151, as a predetermined region, as illustrated in FIG. 5.

Meanwhile, referring to FIG. 6, when the touch screen 151 is divided into a plurality of virtual regions 21, 22, 23, and 24 in a vertical direction, the predetermined region may be the last region 24. For example, when the handwriting input HI starts from the region 22 and enters the region 24 through the region 23, the region 24 is the last region in which the handwriting input HI may be performed. Thus, according to an embodiment of the present invention, when the handwriting input HI enters the region 24, the controller 180 may extends the handwriting input region.

Figure 7:
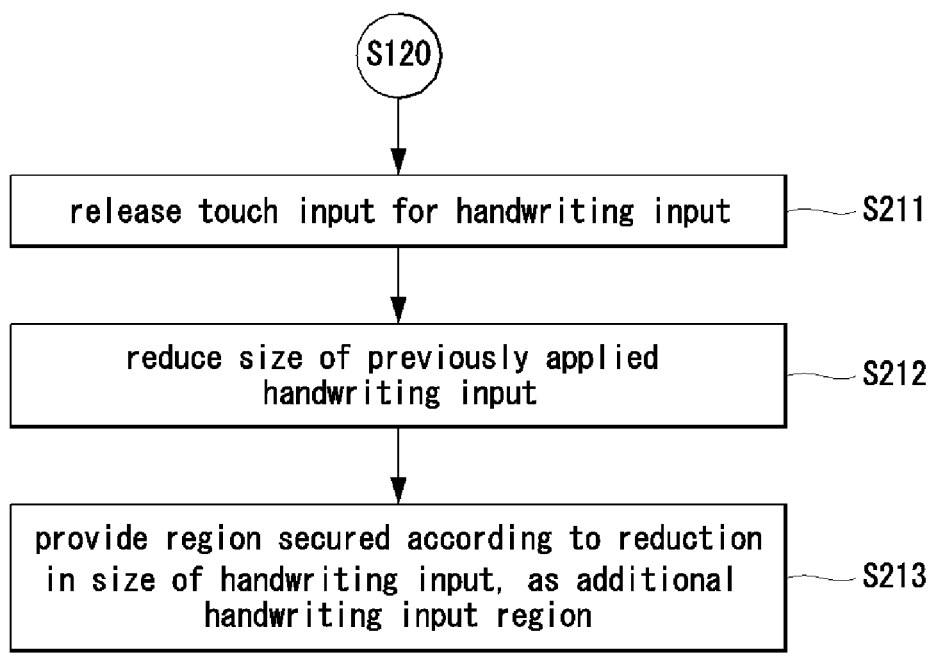
FIG. 7 is a detailed flow chart illustrating a method of controlling a mobile terminal according to the first embodiment of the present invention.

FIG. 7 is a detailed flow chart illustrating a method of controlling a mobile terminal according to the first embodiment of the present invention. FIGS. 8 through 15 are views illustrating the method of controlling a mobile terminal illustrated in FIG. 7 according to the first embodiment of the present invention.

The control method may be implemented in the mobile terminal 100 described above with reference to FIG. 1. An operation of the mobile terminal according to the first embodiment of the present invention will be described in detail with reference to the required drawings.

Referring to FIG. 7, in a state in which a handwriting input enters a boundary region (the region 11 or 12 in FIG. 5 or the region 24 in FIG. 6) of the touch screen 151, when a predetermined input is received, the previously applied handwriting input may be resized.

Here, the predetermined input may include releasing of a touch input for a handwriting input which has entered the predetermined region. Thus, when the touch input for a handwriting input is released in the predetermined region (S211), the controller 180 may reduce the size of the previously applied handwriting input (S212).

Here, the releasing of the touch input for a handwriting input may refer to, for example, releasing of a user's finger's contact with respect to the touch screen 151 in a state in which the user, drawing up a memo with his finger, has entered the predetermined region.

Figure 8:
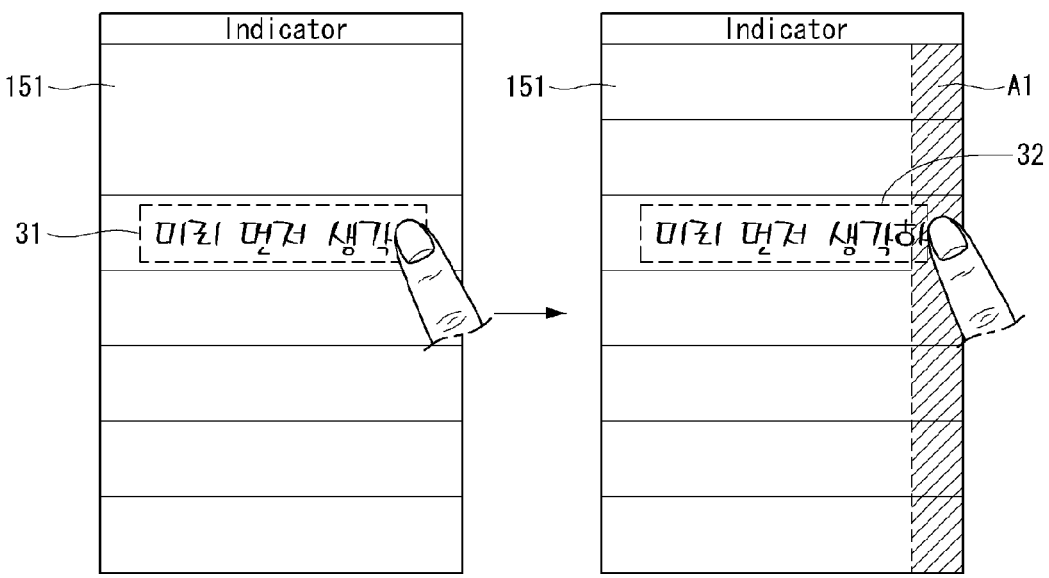
FIGS. 8 through 15 are views illustrating the method of controlling a mobile terminal illustrated in FIG. 7 according to the first embodiment of the present invention.
Figure 9:
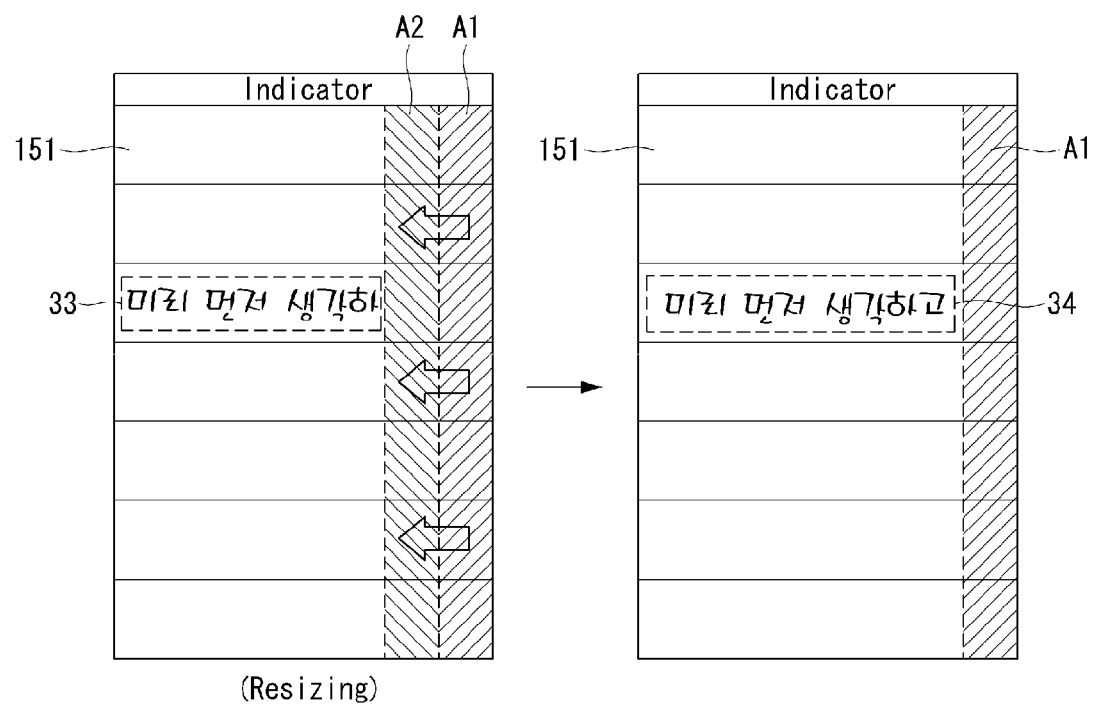

Referring to FIG. 8, when a handwriting input 31 is applied to the touch screen 151 and the handwriting input 32 enters a predetermined region A1, the controller 180 determines that the user will continuously apply the handwriting input. Thus, as illustrated in FIG. 9, the controller 180 reduces the size of the previously applied handwriting input 33. When the size of the handwriting input 33 is reduced, an overall length of the handwriting input 33 is reduced and the region A2 remains empty. Accordingly, the controller 180 may provide the region A2 as an additional handwriting input region A2.

When a handwriting input is newly applied to the additional handwriting input region A2, the handwriting input may be applied at a rate of the reduced size.

Figure 10:
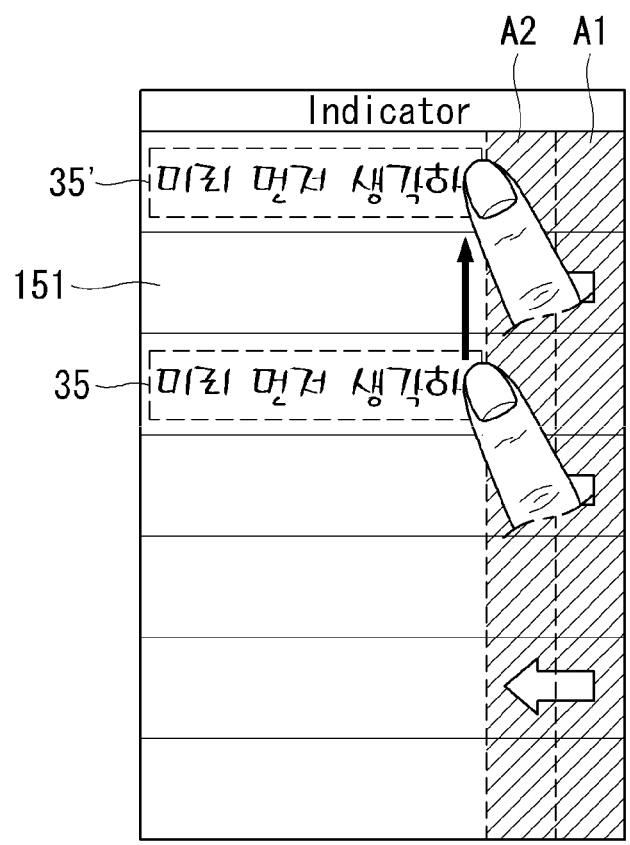

Meanwhile, referring to FIG. 10, when the previously applied handwriting input is resized (reduced) as illustrated in FIG. 9, the controller 180 may activate only the portion in which the handwriting input has been applied and inform the user that the portion is selectable, so that the user may select the entire region of the previously applied handwriting input 35.

For example, when the previously applied handwriting input is reduced in size, the controller 180 may highlight the entire region 35 of the handwriting input. Also, the controller 180 may draw a dotted line along the entire region 35 of the handwriting input, and when an input for selecting the corresponding dotted line portion is received, the controller 180 may control the entire region 335 of the handwriting input such that it is movable. Thus, when an input for moving the entire region 25 of the handwriting input to a upper portion of the touch screen 151 is received, the controller 180 may move the previously applied handwriting input 35 to an upper end of the touch screen 151 and provide a lower end region of the touch screen 151, as an additional handwriting input region.

So far, the example of utilizing a remaining space as a space for an additional handwriting input, by reducing the size of the handwriting input, when a handwriting input enters the predetermined region and is released therein has been described.

Hereinafter, an example of varying the rate of resizing a handwriting input will be described with reference to FIGS. 11 through 15.

Figure 11:
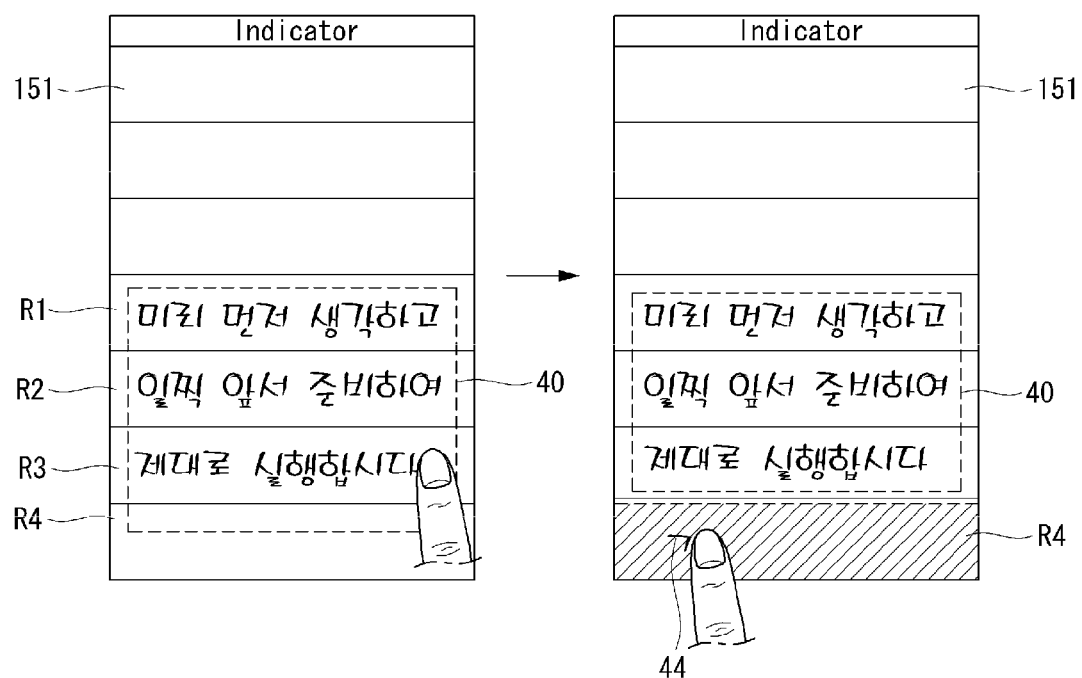

Referring to FIG. 11, a page for a handwriting input may be displayed on the touch screen 151. Here, the page may be divided into a plurality of virtual regions R1, R2, R3, and R4 which are sequentially connected.

The handwriting input may start in the first virtual region R1 and extendedly applied to the second virtual region R2 and even to the third virtual region R3. In a case in which a handwriting input 44 is applied to the fourth virtual region R4 as the last region of the virtual regions, the handwriting inputs applied to the respective virtual regions may be resized at different rates and displayed on the touch screen 151.

Figure 12:
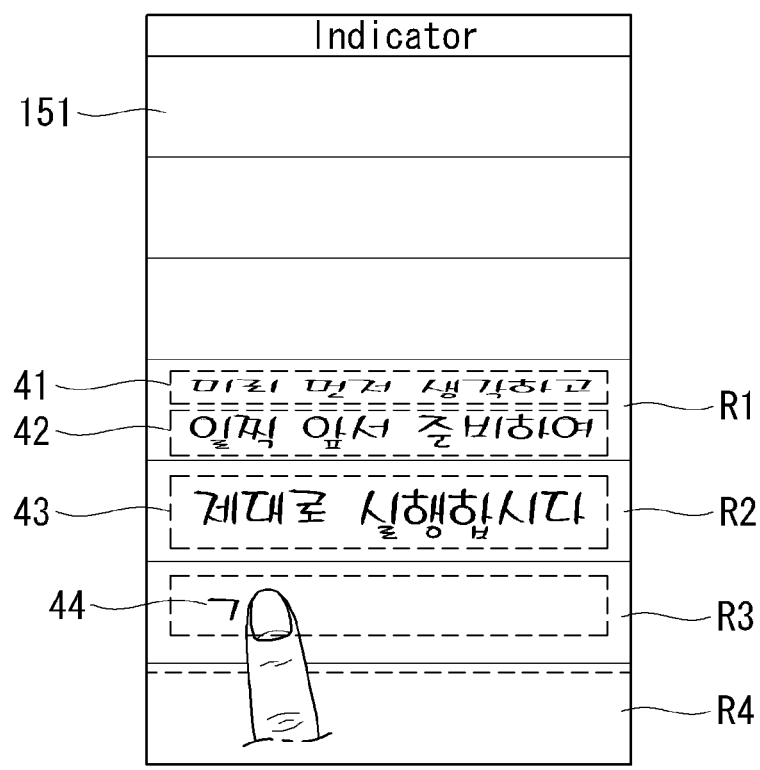

For example, referring to FIG. 12, a handwriting input 41 applied to the first virtual region R1 may be reduced by 50% from the original size thereof, a handwriting input 42 applied to the second virtual region R2 may be reduced by 30% from the original size thereof, and a handwriting input 43 applied to the third virtual region R3 may be displayed as having the same size as that of the original size thereof. Thus, as illustrated in FIG. 12, the handwriting inputs 41 and 42 are positioned in the first virtual region R1, while the handwriting input 43 is positioned in the second virtual region R2. Accordingly, a new handwriting input may be positioned in the third virtual region R3, and thus, a continuous handwriting input may be performed.

Figure 13:
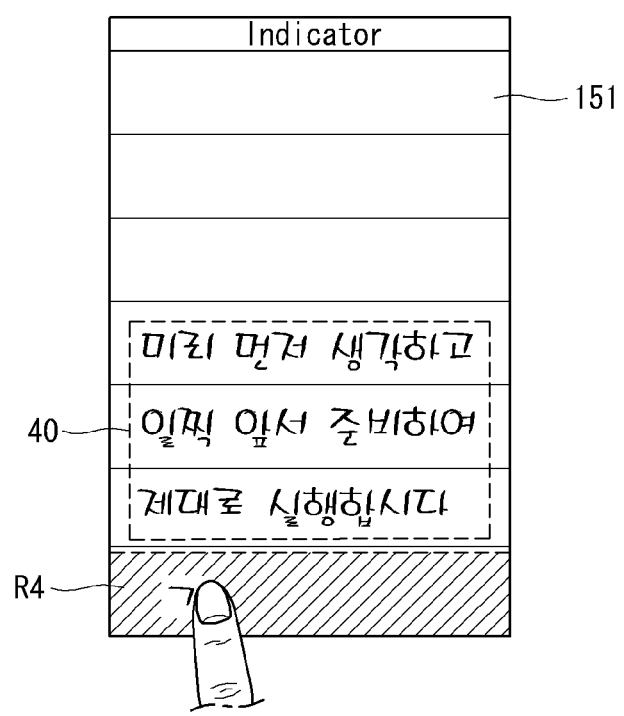

Meanwhile, referring to FIG. 13, in a state in which a handwriting input is input to a plurality of virtual regions, when the handwriting input enters the predetermined region R4, the controller 180 may reduce the size of the previously applied handwriting input 40 in each region according to a predetermined rate, and may enter an editing mode in which the entire region 40 of the previously applied handwriting input is selectable.

In the editing mode, the controller 180 may highlight the entire region 40 of the previously applied handwriting input or may draw a dotted line in the boundary. As the previously applied handwriting input is resized, the controller 180 may maintain the editing mode for a predetermined period of time. For example, the controller 180 may highlight the entire region 40 of the previously applied handwriting input, while maintaining the editing mode for one to two seconds.

Figure 14:
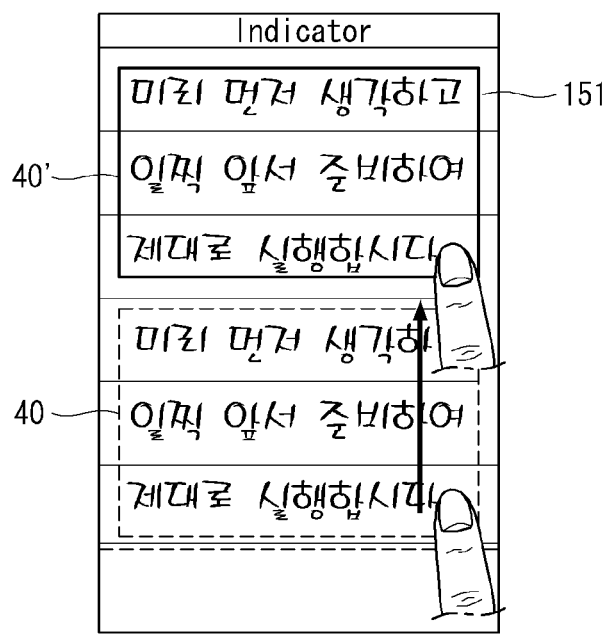

Also, referring to FIG. 14, when a drag input for moving the entire region 40 of the previously applied handwriting input in a predetermined direction is received, the controller 180 may change the position of the entire region 40 of the previously applied handwriting input. Accordingly, an existing region in which the handwriting input existed may be provided as an additional handwriting input region.

Figure 15:
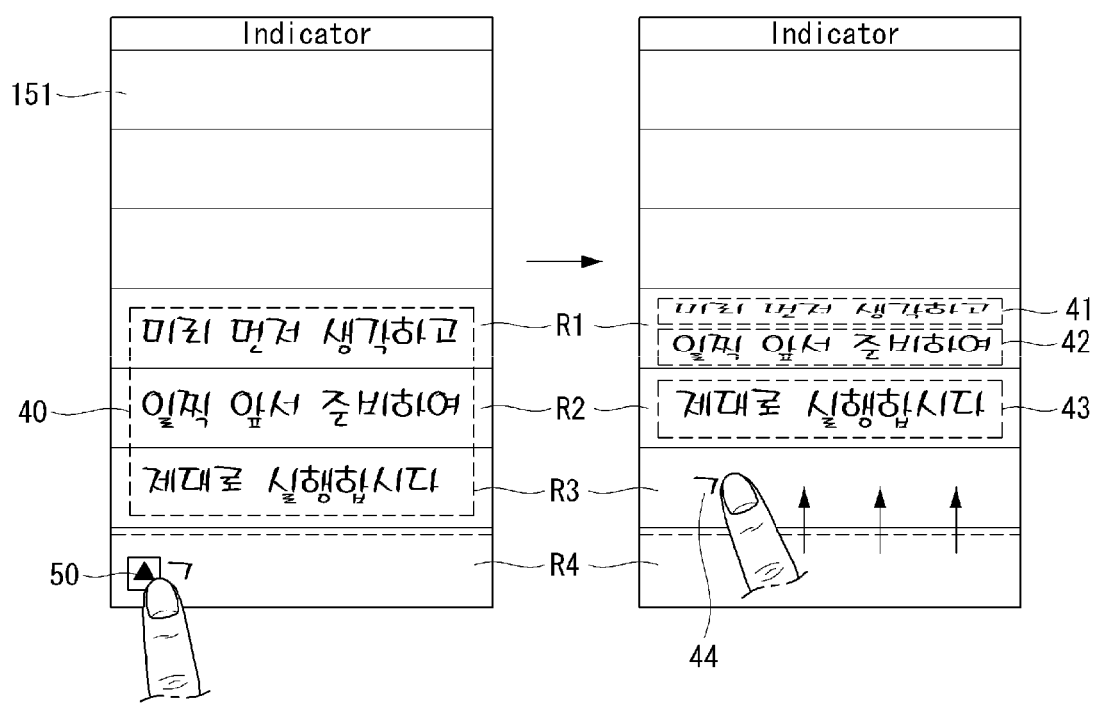

Meanwhile, referring to FIG. 15, when a handwriting input, starting from the first virtual regions R1, extends to the fourth virtual region R4, the controller 180 may display a soft button 50 for extending a space for a handwriting input in the fourth virtual region R4, and when an input applied to the soft button 50 is received, the controller 180 may resizes handwriting inputs of the respective regions at different rates to secure an additional handwriting input space. Accordingly, a handwriting input 44 starting in the fourth virtual region R4 may be positioned in the third virtual region R3 according to the resizing results.

In the above, the case in which when a handwriting input enters a predetermined region, while being applied to the touch screen 151, a size of the handwriting input previously applied and displayed is reduced to secure a page space for inputting a new handwriting input, has been described.

Meanwhile, hereinafter, another example of extending a space for a handwriting input will be described.

Figure 16:
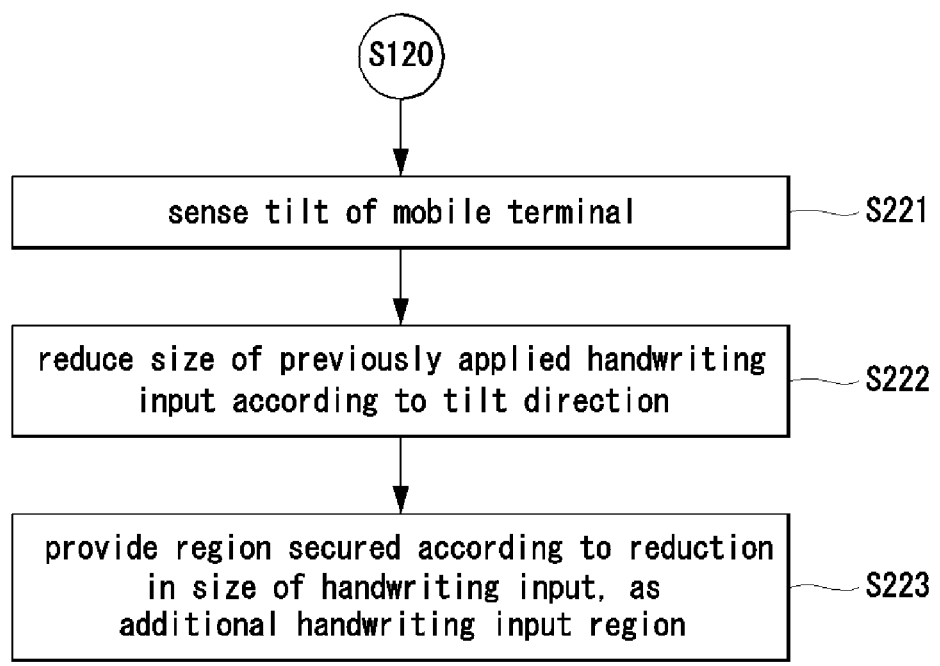
FIG. 16 is a flow chart illustrating a method of controlling a mobile terminal according to a second embodiment of the present invention.
Figure 17:
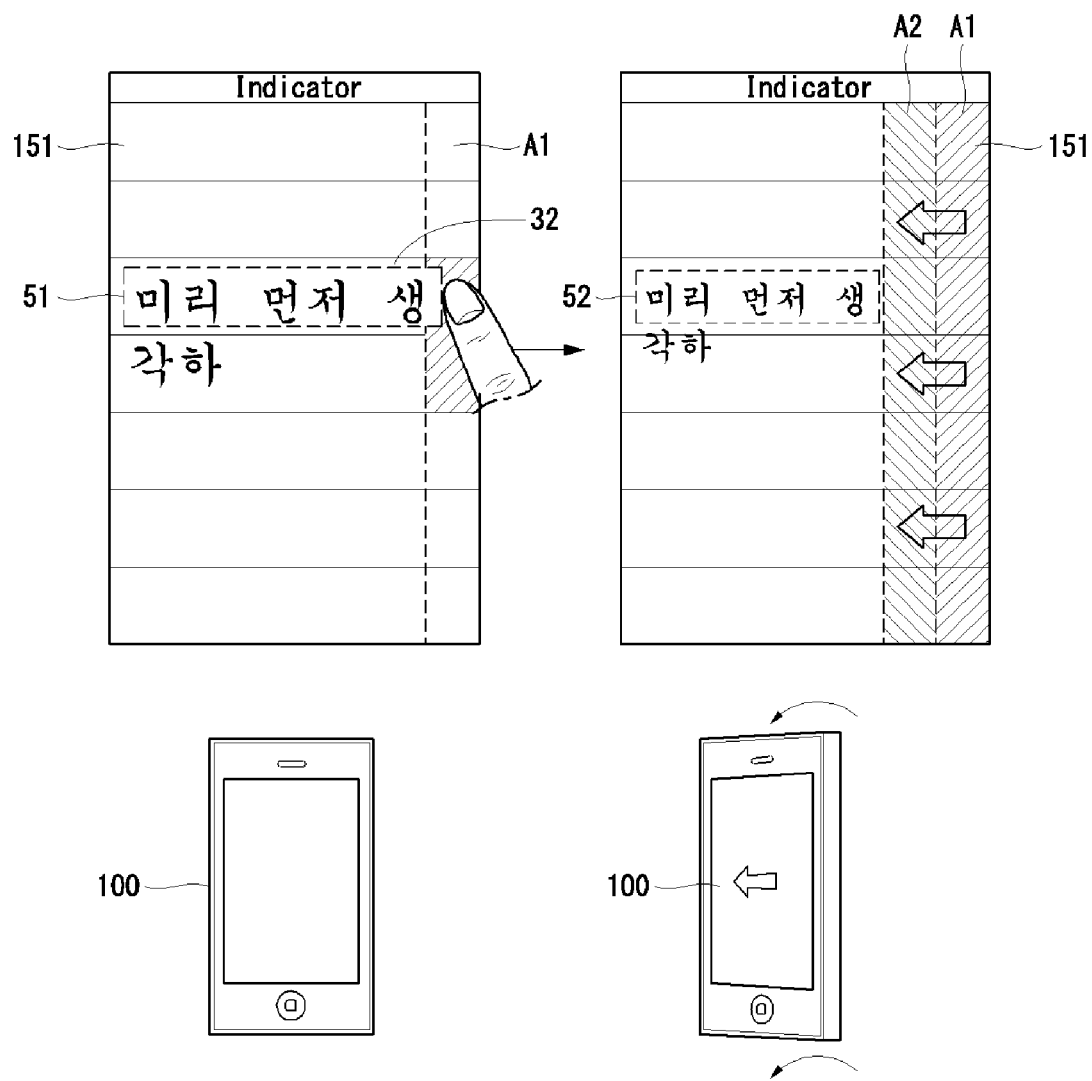
FIGS. 17 and 18 are views illustrating the method of controlling a mobile terminal according to the second embodiment of the present invention.
Figure 18:
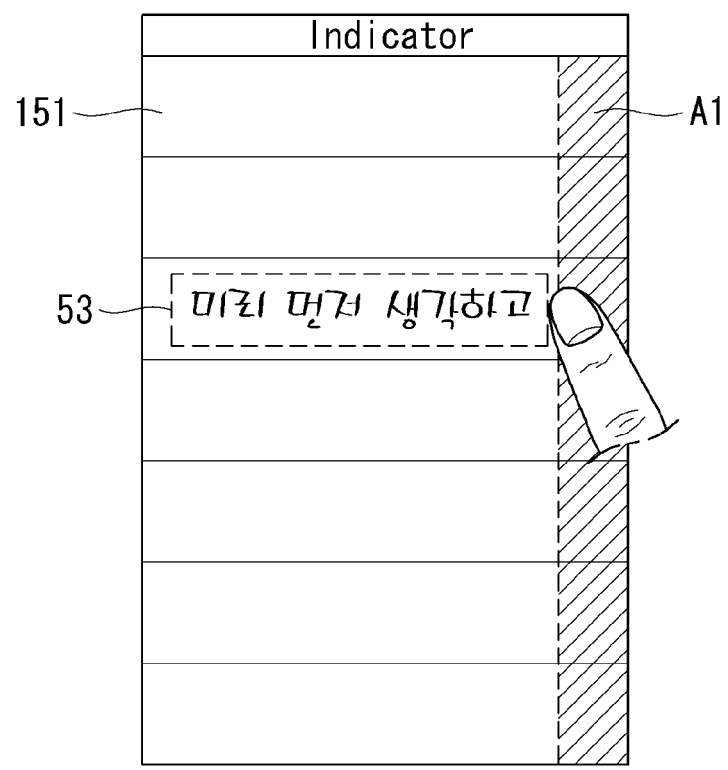
Figure 18:
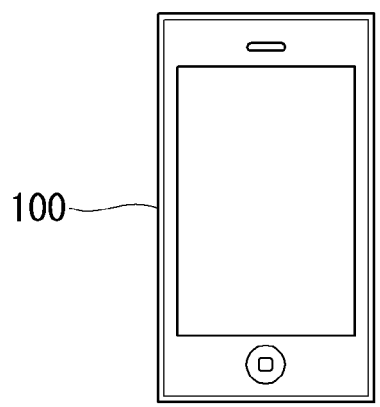

FIG. 16 is a flow chart illustrating a method of controlling a mobile terminal according to a second embodiment of the present invention. FIGS. 17 and 18 are views illustrating the method of controlling a mobile terminal according to the second embodiment of the present invention.

The control method may be implemented in the mobile terminal 100 described above with reference to FIG. 1. An operation of the mobile terminal according to the second embodiment of the present invention will be described with reference to the required drawings.

Referring to FIG. 16, the controller 180 may sense a tilt of the mobile terminal 10 (S221).

The mobile terminal 100 may further include a sensing unit (not shown) for detecting a tilt of the mobile terminal 100. When the mobile terminal 100 is tilted in a predetermined direction, the sensing unit (not shown) may sense it and transmit a predetermined sensing signal to the controller 180.

Here, the controller 180 may receive the sensing signal according to the tilt of the mobile terminal 100, and may reduce a size of a handwriting input in a direction in which the touch screen 151 is tilted according to the sensing signal (S222).

Here, the reducing of the handwriting input in the direction in which the touch screen 151 is tilted may refer to reducing of a space between handwriting inputs and a size of handwriting inputs in the direction in which the touch screen 151 is tilted The controller 180 may provide a region secured according to the reduction in the size of the handwriting input, as an additional handwriting input region (S223). An operation of securing a space for a handwriting input according to resizing of a handwriting input is the same as that described in the first embodiment.

Referring to FIG. 17, a handwriting input 51 may be received through the touch screen 151 and the handwriting input may enter a predetermined region A1. In the state in which the handwriting input 51 has entered the predetermined region A1, when the mobile terminal 100 is tilted to the left as illustrated in FIG. 17, the controller 180 may receive a sensing signal for recognizing the tilt of the terminal from the sensing unit (not shown), and may slidably move the previously applied handwriting input 52 in the direction in which the mobile terminal 100 is tilted, to reduce the size of the handwriting input. Here, the reducing of the size of the handwriting input may include a process of reducing a space between words applied as handwriting inputs and a size of the words as handwriting inputs.

As the size of the handwriting inputs is reduced, the region A2, which has been filled with the handwriting inputs, remains empty. Thus, the region A2 may be provided as an additional handwriting input region.

Thereafter, the mobile terminal 100 may be returned to its original position (i.e., a state in which a tilt thereof is 0), and as illustrated in FIG. 18, an additional handwriting input 53 may be performed in the region A2.

Meanwhile, in FIG. 17, in the state in which the handwriting input 52 has entered the predetermined region A1, the size of the previously applied handwriting input may be even further reduced such that it is proportional to a time during which the mobile terminal 100 is tilted in a predetermined direction. For example, as illustrated in FIG. 17, as a time during which the mobile terminal 100 is tilted in a leftward direction is lengthened, the size of the previously applied handwriting input may be even further reduced.

Meanwhile, although not shown, a handwriting input may proceed from the right side of the touch screen 151 to the left side thereof. In this case, the handwriting input may start from the right side of the touch screen 151 and reach the vicinity of the left boundary. In this case, when the mobile terminal 100 is tilted in the rightward direction, the controller 180 may slidably move the previously applied handwriting input in the rightward direction, to reduce a space between text as handwriting inputs and size thereof.

Thus, according to the method of controlling a mobile terminal according to the second embodiment of the present invention, when the mobile terminal is tilted in a state in which the mobile terminal enters the handwriting input mode and a handwriting input enters a predetermined region, the previously applied handwriting input is resized by referring to the direction in which the mobile terminal is tilted, thus securing a space for a handwriting input.

So far, the examples in which restrictions in the size of the touch screen are overcome by resizing a previously applied handwriting input have been described in the first and second embodiments of the present invention. However, in an embodiment of the present invention, a handwriting input region may be extended without changing a size of the previously applied handwriting input.

Figure 19:
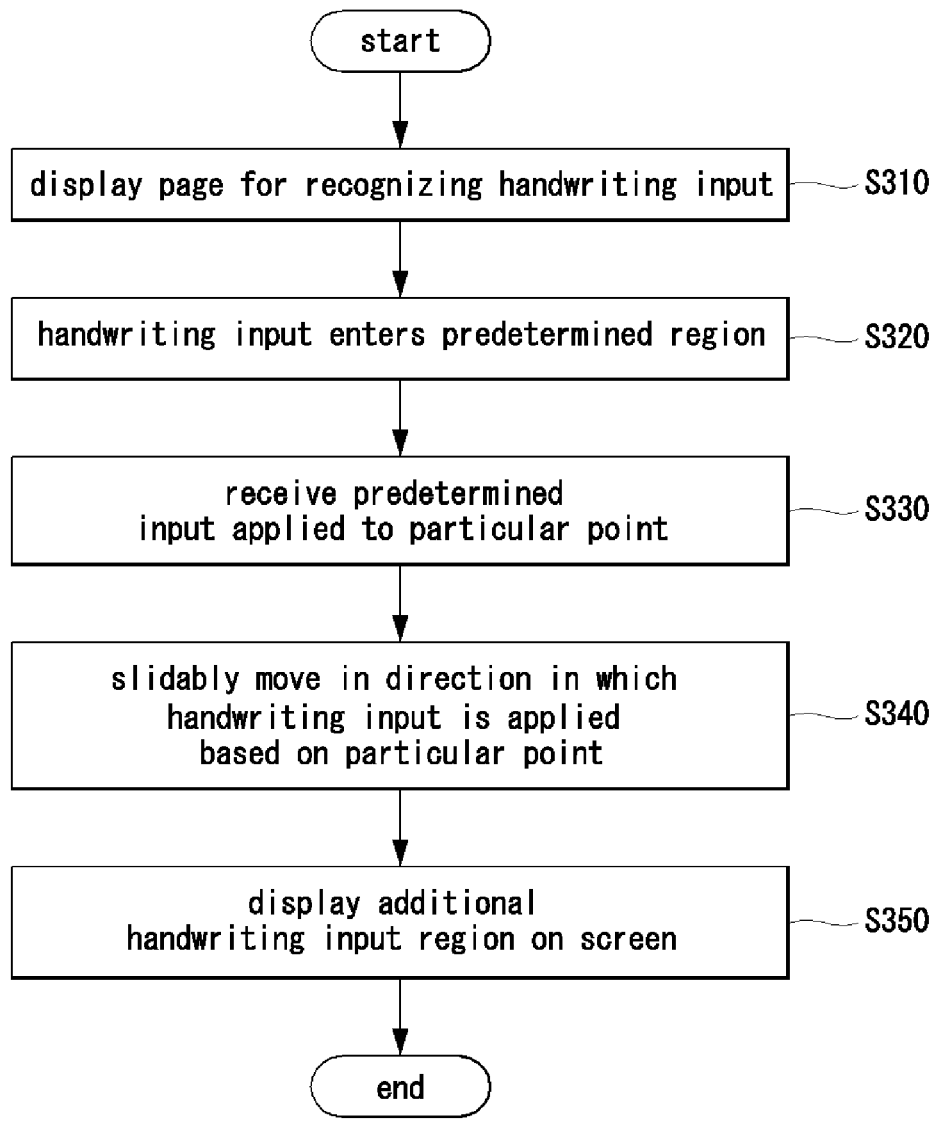
FIG. 19 is a flow chart illustrating a method of controlling a mobile terminal according to a third embodiment of the present invention.

FIG. 19 is a flow chart illustrating a method of controlling a mobile terminal according to a third embodiment of the present invention. FIGS. 20 through 24 are views illustrating a method of controlling a mobile terminal according to the third embodiment of the present invention.

The control method may be implemented in the mobile terminal 100 described above with reference to FIG. 1. An operation of the mobile terminal according to the third embodiment of the present invention will be described with reference to the required drawings.

Referring to FIG. 19, the controller 180 may display a page for recognizing a handwriting input on the touch screen 151 (S310).

When a handwriting input enters a predetermined region (S320), the controller 180 may receive a predetermined input applied to a particular point existing in the predetermined region (S330).

The predetermined input may include a double tapping input applied to a point associated with a direction in which a page is intended to slide within the predetermined region. Namely, in a case in which a handwriting input enters a region not sufficient for a handwriting input, when a double tapping input is input to a particular point, the controller 180 may extend a handwriting input space on the basis of the particular point.

The controller 180 may slidably move the page in the direction in which the handwriting input was applied, by using the particular point as a reference (S340).

Also, the controller 180 may provide a region displayed on the touch screen 151 due to the sliding of the page, as an additional region for a handwriting input (S350).

Figure 20:
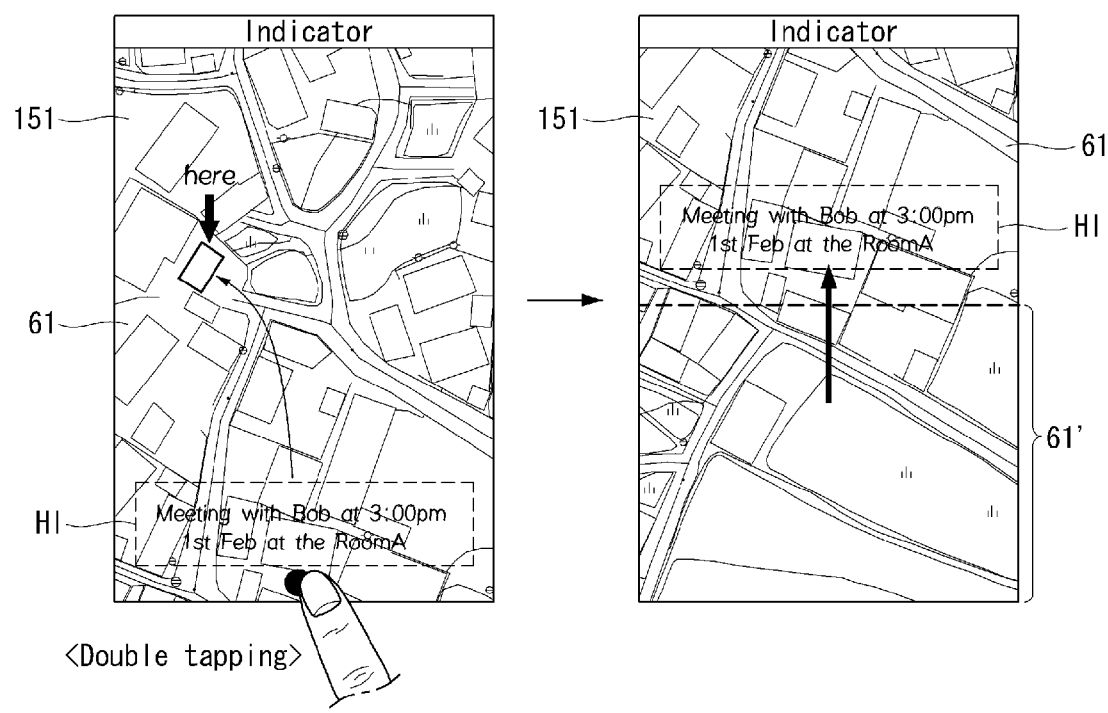
FIGS. 20 through 24 are views illustrating a method of controlling a mobile terminal according to the third embodiment of the present invention.

Referring to FIG. 20, the controller 180 may execute a map application, and display a map application execution screen (map data) 61 on the touch screen 151.

The touch screen 151 enters the handwriting input mode. A handwriting input HI is applied to a map and enters a predetermined region (here, the predetermined region may be a lower region of the touch screen in FIG. 20, which may be divided into a plurality of virtual regions). In this state, when a double tapping input applied to the predetermined region is received, the controller 180 may move the map screen 61 upwardly, and slidably display a map screen 61', which is connected to a lower portion of the map screen 61, on the touch screen 151.

Namely, a direction in which the page is slid may be a direction in which a previously applied handwriting input is positioned on the basis of a position at which a predetermined input is applied.

Meanwhile, the map screen 61' displayed on the touch screen 151 may be extendedly connected to the map screen 61, and when the map screen 61' is slid, a scroll bar may be displayed in one lateral side of the touch screen 161. When an input for moving the scroll bar in a vertical direction is received, the controller 180 may display a handwriting input in the extended handwriting input region (61') and a handwriting input (HI) in the handwriting input region (61) before being extended on the touch screen 151.

Figure 21:
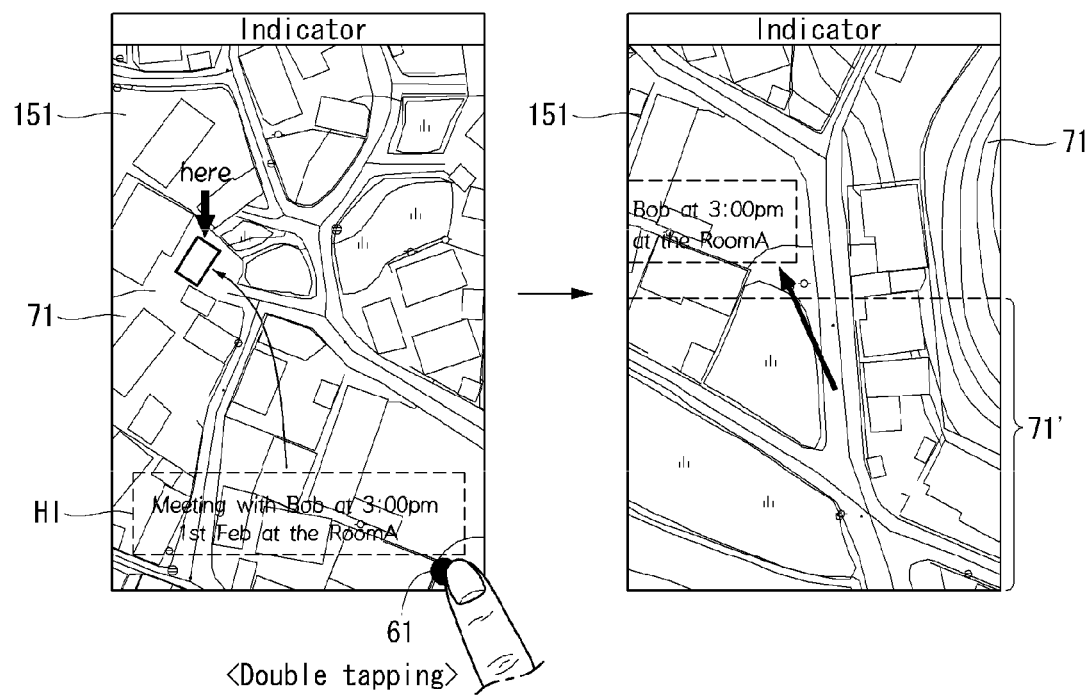

Referring to FIG. 21, when a particular point for receiving the predetermined input is a right lower end point of the touch screen 151, the controller 180 may slide the page 71 in a left upper end direction. Accordingly, a page 71' continued from the page 71 is displayed on the touch screen 151 and an additional handwriting input applied to the page 71' may be recognized.

Figure 22:
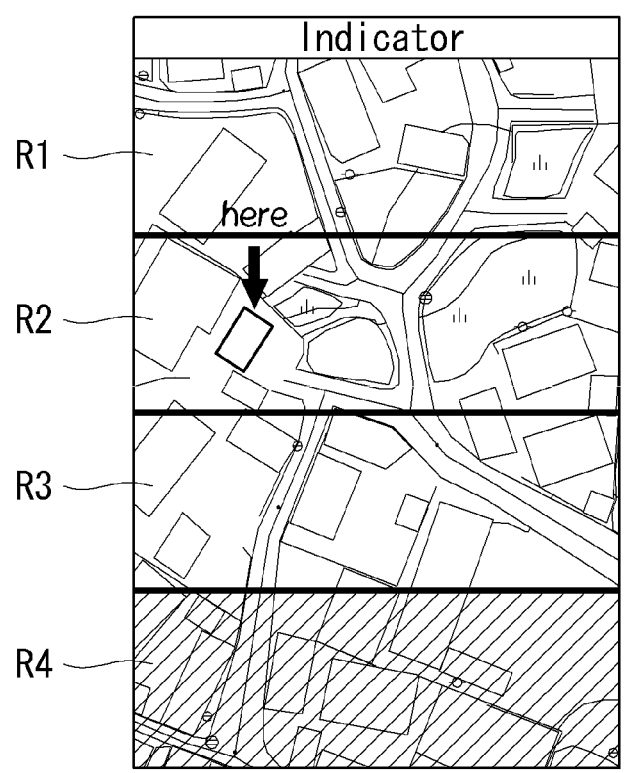

Referring to FIG. 22, in the handwriting input mode, the touch screen 151 may be divided into a plurality of virtual regions R1, R2, R3, and R4. When a handwriting input HI enters the last virtual region R4 on the basis of the first virtual region R1 among the plurality of virtual regions R1, R2, R3, and R4, the controller 180 may display a soft button 81 for extending a handwriting input space on the touch screen 151 as illustrated in FIG. 23.

Figure 23:
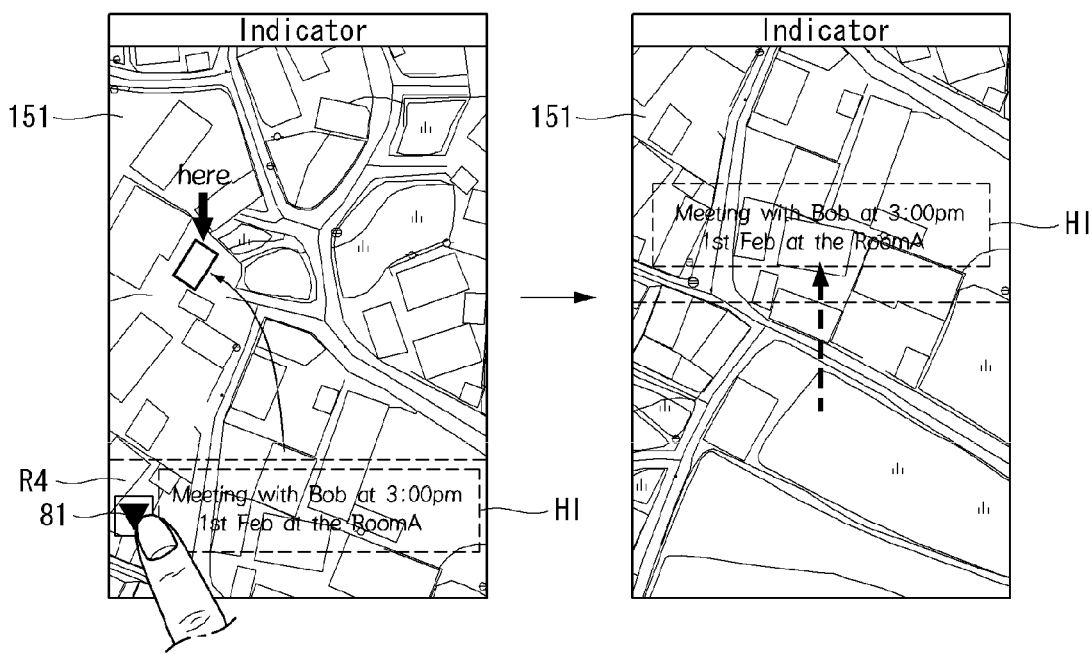

Referring to FIG. 23, the controller 180 may display the soft button 81 in the fourth virtual region R4, and when an input for selecting the soft button 81 is received, the controller 180 may slide the page displayed on the touch screen 151 upwardly to secure an additional handwriting input space.

Figure 24:
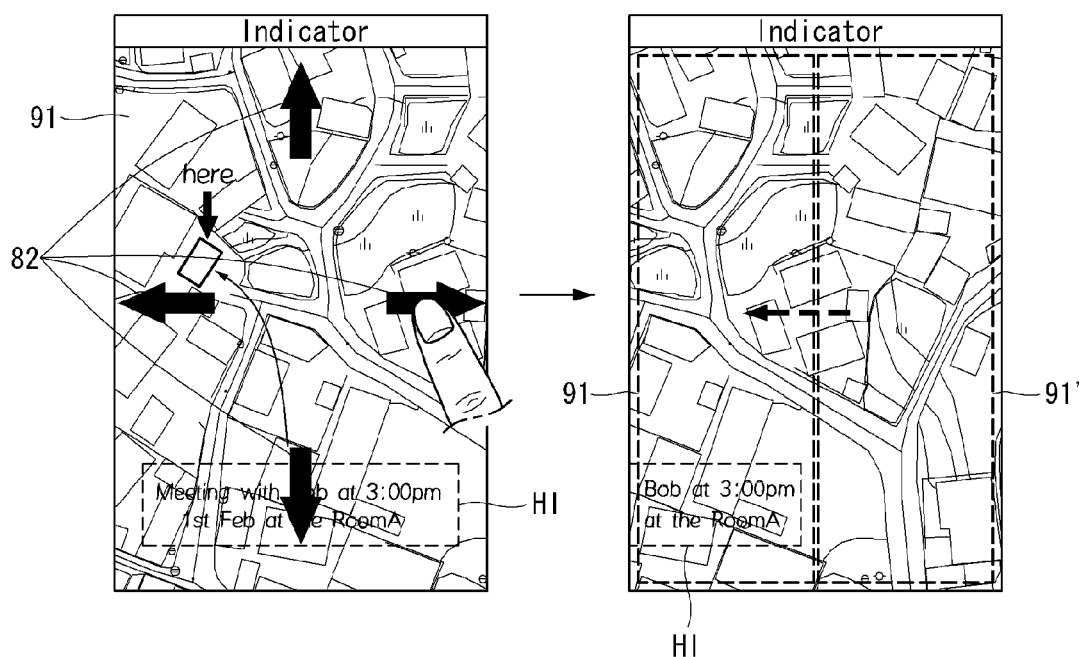

Meanwhile, referring to FIG. 24, when the handwriting input enters the fourth virtual region R4 in FIG. 22, directional keys 82 for recognizing a direction in which the handwriting input may extend may be displayed on the touch screen 151. In a state in which a page 91 is displayed on the touch screen 151, when an input for selecting a right direction key among the direction keys 82 is received, the controller 180 may display a rightwardly extended page 91' on the touch screen 151, while sliding it in a leftward direction. Accordingly, the page 91' may be obtained as an additional handwriting input region.

So far, the operation of the mobile terminal disclosed in the present disclosure has been described in detail through the first to third embodiments of the present invention. However, the present invention is not limited thereto and may be variously modified.

In particular, it has been described that, in a case in which the user draws up a memo on the touch screen with his finger, a stylus, or the like, a memo space can be automatically or manually extended instantly when a memo enters a boundary region of the touch screen However, in the handwriting input mode, although the memo does not enter the boundary region of the touch screen, a memo space may be extended. For example, in a case in which map data is displayed on the touch screen and a memo is intended to be written in the vicinity of a particular point on the map data, when a double tapping input applied to the vicinity of the particular point is received, the particular point may be adjusted to be positioned in the center of the touch screen so that the user may freely write a memo in the vicinity of the particular point.

Meanwhile, in the case of the foregoing embodiment, a page extended for a handwriting input is limited to the page in which a previously applied handwriting input was applied and an extended page, but the present invention is not limited thereto. For example, when a pinch zoom input is received by a multi-touch, while a memo is being received through a handwriting input, a current page may be displayed as a thumbnail image and a page for a new handwriting input may be provided to the entire surface of the touch screen.

The method for controlling of the mobile terminal according to embodiments of the present invention may be recorded in a computer-readable recording medium as a program to be executed in the computer and provided. Further, the method for controlling a mobile terminal according to embodiments of the present invention may be executed by software. When executed by software, the elements of the embodiments of the present invention are code segments executing a required operation. The program or the code segments may be stored in a processor-readable medium or may be transmitted by a data signal coupled with a carrier in a transmission medium or a communication network.

The computer-readable recording medium includes any kind of recording device storing data that can be read by a computer system. The computer-readable recording device includes a ROM, a RAM, a CD-ROM, a DVD?ROM, a DVD-RAM, a magnetic tape, a floppy disk, a hard disk, an optical data storage device, and the like. Also, codes which are distributed in computer devices connected by a network and can be read by a computer in a distributed manner are stored and executed in the computer-readable recording medium.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a touch screen configured to display information; and
a controller configured to:
   control the touch screen to display a page having a handwriting input region for receiving a handwriting input;
   receive the handwriting input via the handwriting input region, wherein the handwriting input is applied in a first direction;
   control the touch screen to display the page sliding in a second direction in response to detecting the handwriting input in a predetermined region of the page and receipt of a predetermined input via the touch screen; and control the touch screen to display an extended portion of the handwriting input region after the page is slid in the second direction, wherein the predetermined region includes a region sized such that a continued handwriting input cannot be performed in the region after the handwriting input is terminated in the region, wherein the predetermined region includes a region spaced apart from a boundary of the touch screen by a predetermined distance, and wherein the predetermined region further includes a fight boundary region of the touch screen and a lower boundary region of the touch screen.

2. The mobile terminal of claim 1, wherein the predetermined input comprises a double tapping touch input applied to a particular point on the touch screen.

3. The mobile terminal of claim 2, wherein the particular point is located at a lower right area of the touch screen, and the second direction is toward an upper left area of the touch screen.

4. The mobile terminal of claim 1, wherein the second direction is opposite to the first direction.

5. The mobile terminal of claim 1, wherein:
the controller is further configured to control the touch screen to display at least one soft button in the predetermined region for extending the handwriting input region; and
the predetermined input comprises a touch input received via the at least one soft button.

6. The mobile terminal of claim 5, wherein the at least one soft button indicates a direction in which to extend the handwriting input region.

7. The mobile terminal of claim 1, wherein the second direction is a direction in which a previously applied handwriting input is positioned on the basis of a position at which the predetermined input is applied.

8. The mobile terminal of claim 1, wherein:
the controller is further configured to execute at least one application; and
the displayed page includes at least one captured image of an execution screen of the at least one application.

9. The mobile terminal of claim 1, wherein the predetermined input comprises a releasing of the continued handwriting input in the predetermined region.

10. The mobile terminal of claim 1, wherein:
the controller is further configured to control the touch screen to divide the displayed page into a plurality of sequentially adjacent virtual regions;
the predetermined region includes a last region of the plurality of virtual regions, the last region adjacent to a boundary of the touch screen; and
the predetermined input comprises receiving the continued handwriting input in the last region.

* * * * *